COINCIDENT CURRENT PERMANENT MEMORY WITH PRESELECTED INHIBITS

Filed March 20, 1961 2 Sheets-Sheet 1

INVENTOR.
James W. Schallerer
BY Greene, Pineles & Durr
ATTORNEY.

Nov. 2, 1965 J. W. SCHALLERER 3,215,992

COINCIDENT CURRENT PERMANENT MEMORY WITH PRESELECTED INHIBITS

Filed March 20, 1961 2 Sheets-Sheet 2

INVENTOR.
James W. Schallerer

BY Greene, Pineles & Durr

ATTORNEY.

United States Patent Office 3,215,992
Patented Nov. 2, 1965

3,215,992
COINCIDENT CURRENT PERMANENT MEMORY WITH PRESELECTED INHIBITS

James W. Schallerer, New Shrewsbury, N.J., assignor, by mesne assignments, to Indiana General Corporation, a corporation of Indiana Filed Mar. 20, 1961, Ser. No. 96,903
10 Claims. (Cl. 340—174)

This invention relates generally to coincident current magnetic core memory systems, and more particularly to such memory systems with fixed or predetermined programs.

Digital computer systems are being increasingly used in the automation of factory processes, military equipment, and the like. The memory or program section of the computer contains a series of instructions that are translated into sequential external control functions. A number of applications utilize preset operational sequencing, as in the control of some chemical processes, in missile guidance systems, etc. The use therein of a fixed program memory, where the information of the entire memory system is always the same, results in both assured accuracy and economy for the computer.

A normal coincident current magnetic core memory system contains a series of identical magnetic core planes. Each memory plane is constructed of small ferrite cores in an $x$ and $y$ array. Each core is threaded with one of the $x$ and $y$ selection wires, to form a matrix. The cores of each memory plane also are threaded with an inhibit and a sense wire.

Prior attempts to form fixed memory planes broke out those ferrite cores from completely manufactured planes, at the zero locations required. In this way, only ones need be written-in the memory planes, in all the remaining cores. The result is a significant economy in the inhibit driver section of the computer, as much less driver circuitry and power are required. Also, the possibility of write-in or read-out error is materially lessened due to less inhibit circuit components, and no inhibit coding requirement. All the cores left always read-out as ones when addressed, and the "no-core" locations always read zero, as preset physically on the planes.

Such prior method, however, had a major drawback. Modern memory planes are arranged wherein their cores and the sense winding geometry result in minimum signal disturbance due to half-select induced voltages. The half-select signals tend to cancel out in each sense winding. With many cores broken out of each frame, no half-select signals will be contributed at these matrix points. The undesirable result is substantial unbalance in each sense winding due to the unwanted noise not cancelling out.

In an effort to minimize such unbalance, each individual memory plane may have its core-array and sense winding geometry specifically designed for its required zero-one pattern.

In a memory with say forty planes, each frame would contain a different pattern, and, therefore, forty different geometrical designs would be required. In practice, the core break-out method is thus seen to be very expensive of both engineering and production time, limiting its utility.

In accordance with the present invention, all the above problems are overcome. No core break-out is used, and the conventional sense wire-core array geometry is retained in each frame. However, in place of the conventional inhibit winding, a corresponding fourth wire is threaded only through the required zero cores in each matrix. This "reset" wire serves as the common inhibit for all the zero cores, and is threaded through these cores in the same half-amplitude current pulse and direction as an inhibit wire.

The reset wire current pulses act as an inhibit current pulse in a normally wired coincident current memory frame, except that only the required zero cores can be "inhibited" in each frame. The remaining cores in each matrix can receive no inhibiting current pulse, and are, therefore, always changed by the $x$–$y$ address pulses, and remain effectively as ones for read-out. In read-out, the normal balanced sense winding arrangement and action occurs, with minimum half-select noise. No sense winding reengineering is needed, each frame remaining at optimum.

Once the zero-one matrix pattern for each frame is known, it is relatively simple in production to produce the corresponding frame, as only the zero cores are threaded with the fourth or reset winding. The simplicity of the inhibit system for such fixed memory planes is assured. The reset winding may thus be driven at each wire pulse without regard to the selective process of zero or one coding inherent in normal inhibit operation. With less cores to drive per frame, the overall memory requires less reset drive power than with conventional inhibit arrangements.

The present invention also readily lends itself to incorporate multiple fixed programs in a given memory. By threading through two or more reset windings in each memory plane, with each reset winding set coded for a different program, selective use of the reset windings results in their corresponding fixed programs. In processes that may have say only two or three optional control programs, the single multiple fixed memory system hereof provides the accuracy and system economy referred to hereinabove.

It is accordingly, a primary object of the present invention to provide novel fixed program coincident current magnetic core memory systems.

Another object of the present invention is to provide a novel fixed program memory core plane with a reset winding serving as a common inhibit drive for a preset zero core pattern.

A further object of the present invention is to provide a novel fixed program memory core plane retaining the conventional core matrix and sense winding geometry with minimum half-select signal noise.

Still another object of the present invention is to provide a novel fixed program core memory system having a plurality of individual preset programs.

Still a further object of the present invention is to provide novel fixed program coincident current magnetic core memory systems of improved accuracy and substantially simplified circuitry and cost.

These and further objects of this invention will become more apparent from the following description of exemplary embodiments thereof illustrated in the drawings, in which.

Figures 1, 2:
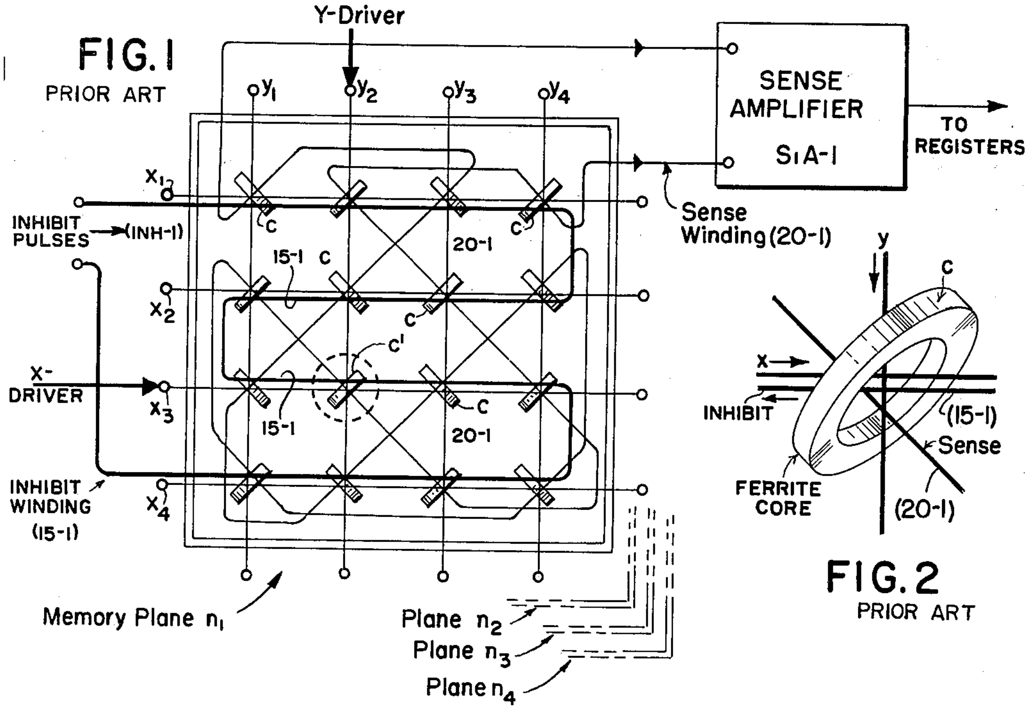
FIG. 1 is a diagrammatic representation of a conventional coincident current magnetic core memory frame with optimized core array-sense winding geometry.
FIG. 2 is an enlarged perspective illustration of a magnetic core and the several frame wires threaded therethrough.

In FIG. 1 is illustrated a typical memory frame or plane $n$, shown as a 4 x 4 matrix of ferrite cores $c$. Practical core planes are, of course, of larger size, e.g. 64 x 64; or in rectangular configurations as well. The square-loop ferrite cores $c$ are binary in nature, as is well known. They remain at their zero or their one saturation levels. When a proper net current pulse switches them, they rapidly assume the opposite level. A particular core $c'$ is addressed or selected in the core $x$–$y$ matrix through its $x$ and $y$ selection wires: $x_1, x_2, x_3, \ldots$ and $y_1, y_2, y_3 \ldots$ respectively. The address may be sequential or random, as required. This is accomplished through $x$ and $y$ drivers selectively addressing or impressing half-amplitude current pulses to the corresponding $x$ and $y$ selection wires for core $c'$. In the plane $n_1$ core $c'$ is selected through the $x_3$, $y_2$ wires; this being its matrix location. All the other cores $c$ along the $x_3$ and $y_2$ wires receive only half-amplitude currents, and remain at their respective magnetic levels.

Addressed core $c'$ receives a full net current pulse from the $x_3$, $y_2$ coincident current drive, and would reverse its magnetic state if the net pulse current direction is so directed. However, if a simultaneous half-amplitude current pulse passes through the inhibit winding, 15–1, in the opposite direction to the $x$ and $y$ currents in core $c'$, no change in the magnetic state of the core occurs. Such inhibit action is used during program write-in, with the inhibit winding 15–1 energized when a zero state is desired at any addressed or selected core, as $c'$. Such inhibit action is indicated in FIG. 2.

For the read-out operation, the sense winding 20–1 is used. The sense winding 20–1 is connected to sense amplifier S.A.–1, which in turn connects to the computer registers. When the particular core, as $c'$ is addressed during read, through half-amplitude $x$ and $y$ driver select pulses, an induced signal appears in sense winding 20–1 if the magnetic state of core $c'$ is thereby made to reverse. This signal appears in sense amplifier S.A.–1, and is conducted as a signal to the registers. If, on the other hand, the core $c'$ was in the opposite state, it is not reversed, and no output signal is generated.

Figure 3:
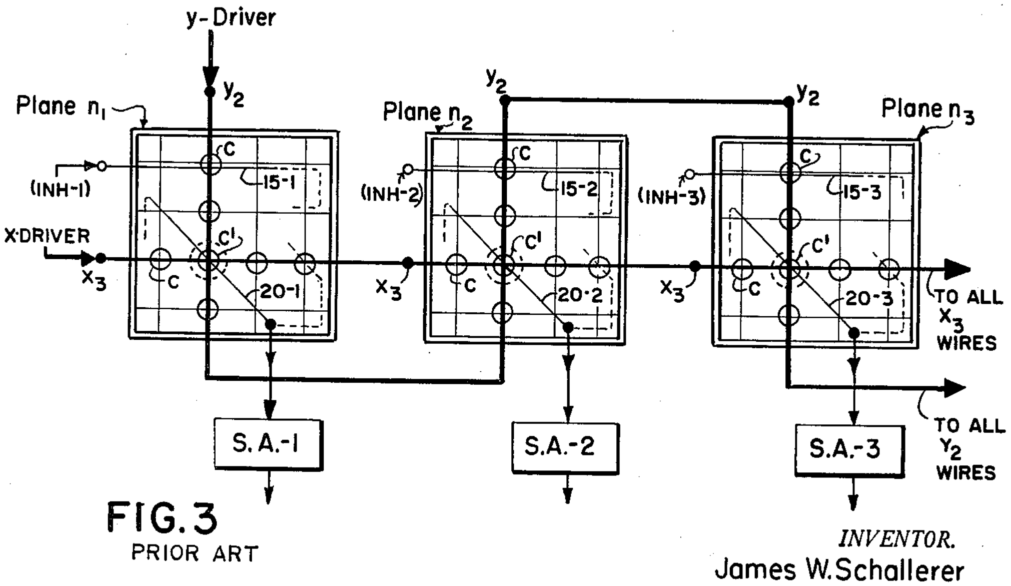
FIG. 3 is a schematic circuit diagram of a memory system with a plurality of core matrix frames.

However, a series of half-select signals are induced in the sense winding 20–1 at each read-out cycle due to reaction of the unaddressed cores $c$ along the pulsed $x$ and $y$ selection wires: being the cores along wires $x_3$ and $y_2$ for core $c'$. Referring to FIG. 3, we note these cores in each core plane $n_1, n_2, n_3 \ldots$, that generate half-select signals. The individual sense windings 20–1, 20–2, 20–3 . . . pick up these unwanted signals, inherently in the core memory system.

It is important, therefore, to balance out and minimize such half-select signals in each sense winding 20 in each frame ($n$). This is accomplished by proper geometric arrangements and relative orientation of the matrix cores $c$ and the sense winding 20. FIG. 1 illustrates a satisfactory arrangement in this regard, as known to those skilled in the art. It is important to realize that each of the cores $c$ in the matrix is related to the others and the sense winding in this balancing out. This is the reason the core break-out system for fixed core memory planes is so impractical, as aforesaid. It is greatly advantageous to retain the engineered optimum core array and sense winding geometry for production continuity as well.

To better set forth the advantages and principles of operation of the invention system, additional background of conventional overall core memory arrangements is briefly presented. Such memory systems comprise $n$ planes, as forty, fifty and more; one $n$ plane for each bit of the system "word" capacity. These planes are stacked as indicated, $n_1, n_2, n_3 \ldots$ in FIGS. 1 and 3. All the corresponding selection wires $x_1, x_2, x_3 \ldots$ of the $n$ planes are connected in series; as are all the $y_1, y_2, y_3 \ldots$ wires frame to frame. In FIG. 3 the $x_3$ and $y_2$ selection wires are shown in their serial connection.

When the $x$ and $y$ drivers address the memory, the cores, as $c'$ in each plane $n_1, n_2, n_3 \ldots$ in the same matrix location or "address", here at $x_3$, $y_2$, receive two coincident half-amplitude current pulses, in the same direction. If this net full current pulse causes the reversal of magnetic state, e.g. from zero to one, of a selected core $c'$ its corresponding sense winding 20 impresses a signal to the associated sense amplifier S.A.-1, S.A.-2, S.A.-3, . . . Read-out of the program in the system is thus accomplished by step-by-step addressing, and individual frame $n_1, n_2, n_3$ sensing.

By suitably phasing the $x$ and $y$ drive currents as well as the inhibit current directions through each individual core $c$, one establishes the wire and read aspects with respect to the required zero and one core states, as is known to those skilled in the art. Conventionally, to write the program into the core memory system thus requires the inhibit winding 15–1, 15–2, 15–3 . . ., of each plane $n_1, n_2, n_3 \ldots$, to send a half-amplitude current pulse into the selected core $c'$ simultaneously with the $x$ and $y$ driver pulses when the core state is not to be changed from zero.

In other words, when a zero is to be written-in in an addressed core $c'$ in a matrix, as in plane $n_1$, the inhibit driver inh.–1 impresses its pulse into inhibit winding 15–1 simultaneously with the $x_3$ and $y_2$ driver pulses for core $c'$. Such core $c'$ then remains at zero in the write cycle. If core $c'$ is to be a one in the program, the inhibit driver inh.–1 sends no inhibit pulse through, and the addressed core $c'$ is changed from a previous cleared state to one.

Figure 4:
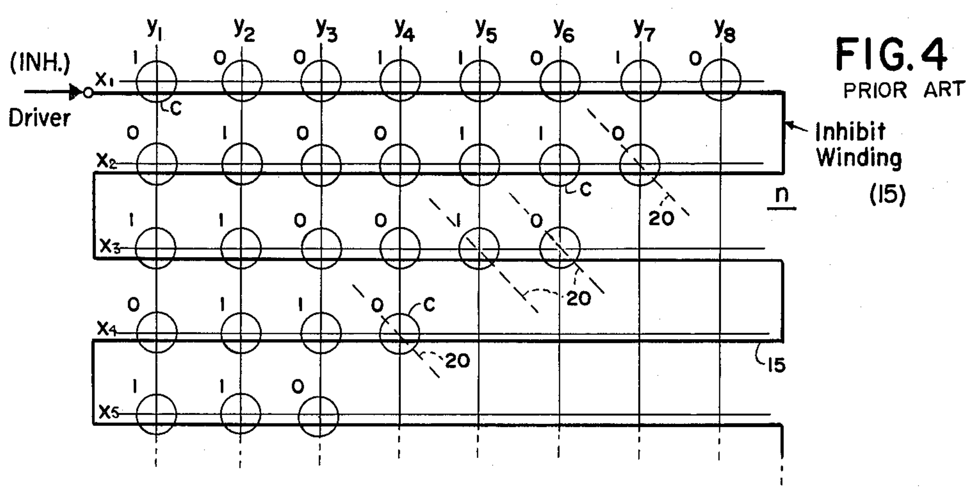
FIG. 4 is a schematic diagram of a conventional memory core frame inhibit operation.

FIG. 4 illustrates such write programming as used for a large matrix plane, with the cores indicated at their desired zero and one states in a frame $n$. Frame $n$ represents an 8 x 8 core memory plane; it being understood that other core matrix dimensions may be used. The $x$ and $y$ drive selection wires $x_1, x_2, x_3 \ldots$ and $y_1, y_2, y_3 \ldots$, are illustrated, as is the inhibit drive winding 15. The conventional sense winding 20 is merely indicated in the diagram (FIG. 4), for clarity, but is to be included in the actual plane, as indicated at 20 in planes ($n$) of FIGS. 1 and 3.

The coded memory data, the pattern of zero and one states for the cores $c$, is established in the manner well known in the art. Whenever a particular core $c$ is addressed (at $x$, $y$), a half-amplitude current inhibit drive signal is simultaneously impressed on inhibit winding 15 through the inhibit driver (INH) for zero states. Thus, cores at $(x_1, y_2)$, $(x_1, y_3)$, $(x_1, y_6)$, $(x_2, y_1)$ etc. are retained in their zero saturation states in this manner. On the other hand, when the memory core state of one is desired, no inhibit current is impressed on the inhibit winding 15 upon the cores $x$, $y$ address drive signals. It is noted that all the cores $c$ are in series for the common inhibit winding 15. Thus, the inhibit driver (INH) must have sufficient power to suitably energize all the cores $c$ at each inhibit drive pulse. Further, it must have a synchronous selective or sensing arrangement to re-establish the coding, upon the re-write cycles, as is well known.

Figure 5:
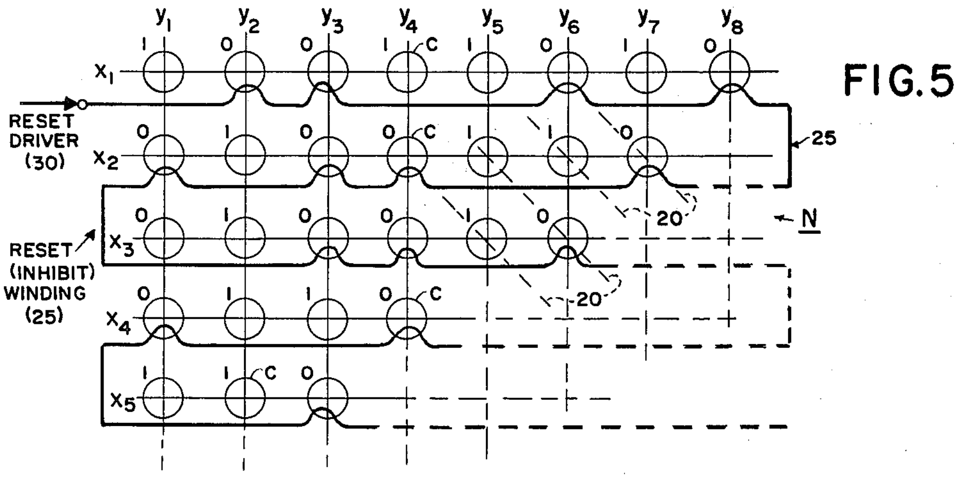
FIG. 5 is a schematic diagram of a section of a magnetic core memory frame incorporating the invention fixed program reset-inhibit system.

In FIG. 5 is illustrated a frame N of the same core matrix size as frame $n$ of FIG. 4, and containing the same memory program. The sense winding 20 is understood to extend through the whole plane N. The "inhibit" winding 25 is arranged and constructed in accordance with the present invention. The winding 25 is an inhibit-type, being continuous and individual to each frame (N), as are the normal inhibit windings 15. It has an "inhibit" or reset driver 30, for the frame N. However, the winding 25 is threaded only through the cores $c$ that are required to be zero in a fixed program, and are not coupled or otherwise passed through the required one cores. The diagram, FIG. 5, clearly shows this relationship.

The threading of winding 25 through the cores $c$ that are to remain zero in the fixed program desired, is performed in the normal inhibit winding relationship, such as shown in FIG. 2. The cores $c$ that are to be one in the fixed program remain unthreaded, as indicated. It is to be understood that the designated zero and one states in a given system of memory data refers to the respective states wherein the one is established by coincident half-amplitude currents in an addressed $(x, y)$ core with no inhibiting "staying" pulse. Corresponding other applications can be likewise employed.

The threading of the invention inhibit-type or reset winding 25 through the zero cores results in the significant advantages stated hereinabove. The operation of these frames (N) in a memory system will now be evident to those skilled in the art. There are $N_1$, $N_2$, $N_3$ . . . core planes corresponding to N of FIG. 5, but each with its individual coded $x, y$ core matrix in zero and one array, as the fixed program for that computer memory section requires. Once so set up, the fixed memory operation in the computer, as a data store is the same as in established systems.

The address of the cores $(x, y)$ are stored in an address register flip-flop, and the cores are decoded down on the $x$ and $y$ sides, with half-amplitude read currents. Their information is transferred to the sense winding 20 during a read-out, and the result transferred to the sense amplifier and output register (see FIGS. 1 and 3). After a read of a core $c'$ in each N plane has occurred, half write currents are applied to their two select wires. Just previous to this write pulse a current of half read magnitude will be turned on and sent through the reset winding 25. This current acts as an inhibit current in a normal coincident current memory, except it is effective only for those cores through which reset winding 25 is threaded, namely, the program zeros.

No sensing arrangement or circuitry is thus required to determine whether or not the inhibit driver should be turned on during a write. When a one is to be restored during a write cycle, it is automatically performed where required as the reset-inhibit winding 25 does not pass through the one cores. In this way a one is written-in even though the reset winding 25 may be simultaneously pulsed. The one cores will be energized with a full write field, leaving it then in the one state. The "inhibit" or reset drivers 30 for the N frames for windings 25, require less power rating than for conventional inhibit windings of the same size matrix. This is because they drive fewer cores for a given matrix size; driving only the zeros.

As the cost of inhibit drivers is an expensive part of a computer system, the resultant economy is an important factor. Since no sensing arrangement is needed for individual write cycling of the N frames in a system, a plurality (or all), of the frames of the memory section ($N_1$, $N_2$, $N_3$ . . .) can be connected in series. This simplifies circuitry and the size of the reset driver section, making for further economy and accuracy. Further, the inhibit sensing circuitry is rendered unnecessary for each frame.

As stated, the balanced geometry of the sense winding 20 of each frame (N) remains intact despite the novel reset winding 25. Thus minimum half-select noise prevails. Also, should it be determined during production test of a frame N that a zero was not "threaded into" a core $(x', y')$ by the reset winding 25. This core is thereupon broken-out. In fact, a few such zero errors can be "broken out" of the plane N, which otherwise has its reset winding properly threaded for the frames fixed program.

The relatively small half-select signal unbalance contributed by only a few broken out cores is satisfactory for most applications. However, such zero errors may be "repaired" without the said break outs. This is readily accomplished by threading a second wire through the new cores to become zero. The second wire is then connected in series with the main reset winding 25 of the frame; and the frame will thereupon operate exactly as frame N of FIG. 5. No half-select signal unbalancing occurs in this latter circuit.

Figure 6:
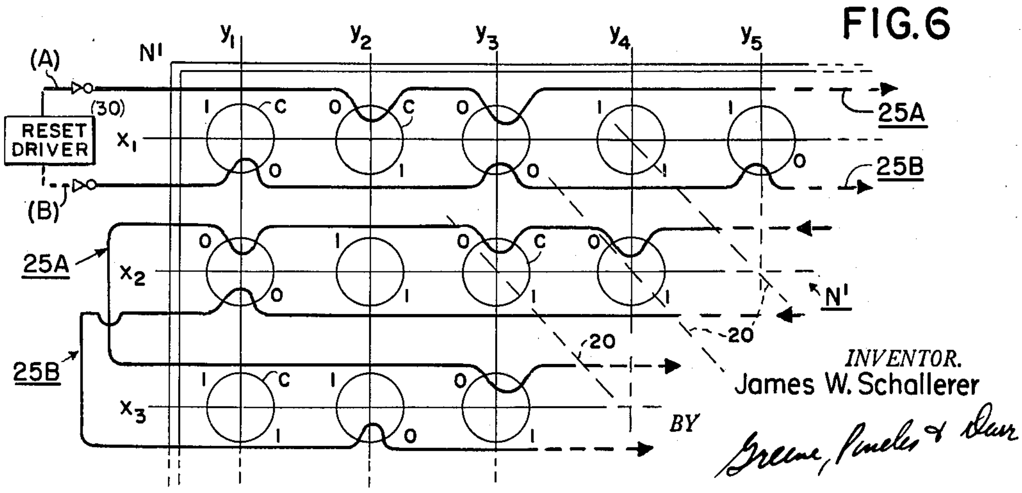
FIG. 6 is a schematic diagram of a section of a magnetic core memory frame incorporating the invention's plural fixed program system.

The principles of the present invention further provide for planes with plural fixed memory programs. FIG. 6 schematically illustrates a frame N′ for two fixed memory programs. A separate reset "inhibit-type" winding 25A, 25B is used in the frame (N′) for each desired fixed program. The usual $x, y$ selection wires and a single sense winding 20 are incorporated in each frame (N′). The first reset winding, 25A, is threaded only through those cores $c$ that are to be zero in the first program $(a)$. The A program of ones and zeros for the cores $c$ is herein made to correspond to that set in frame N (FIG. 5), for ready comparison. The second program B is threaded into those cores $c$ that are to be zeros, with reset winding 25B.

It is noted that individual cores may be a zero in one program and a one in the other, as cores $(x_1, y_1)$, $(x_1, y_2)$, $(x_1, y_5)$, $(x_2, y_3)$ etc. Also, some cores can be a one in each program and such a core is unthreaded by either reset winding, as at $(x_1, y_4)$, $(x_2, y_2)$, $(x_3, y_1)$, etc. Further, those cores that are zero in both the A and B programs, are threaded by both the reset windings, 25A and 25B: as at $(x_1, y_3)$, $(x_2, y_1)$ etc.

Each reset winding is selectively connected (A, B) to the common reset driver 30, i.e., only when the corresponding (A or B) fixed program is to be used. The operation of the reset windings 25A, 25B are thus independently performed, as required. In the same manner additional reset windings for correspondingly further fixed programs may be incorporated, within the practical limitations of core internal diameter and threading wire size for a given plane construction.

Another application of the present invention, is to combine one or more fixed programs with a conventional full inhibit or general winding. This is readily accomplished by retaining the full inhibit winding in each plane, and threading a fixed program reset-inhibit winding through the cores, as well.

Although the present invention has been described and set forth with exemplary embodiments, it is to be understood that modifications as to construction, arrangement and application thereof may be made within the broader spirit and scope of the invention, as set forth in the following claims.

I claim:

1. a fixed program memory plane comprising
- a matrix of magnetic elements arranged in rows and columns,
- circuit means for selectively addressing each of said elements with coincident current pulses capable of switching the magnetic states of the corresponding elements,
- means for maintaining each of a plurality of predetermined elements of said matrix on a particular one of its two magnetic states comprising
  - a winding coupled with said predetermined elements to be maintained in a particular magnetic state, and
  - means for impressing current pulses through said winding to selectively prevent the switching capability of said coincident current pulses when addessed to said predetermined elements,
  - said winding being effectively unthreaded with the remaining elements of said matrix.

2. The fixed program memory plane as set forth in claim 1 in which said magnetic elements are each toroidal cores.

3. The fixed program memory plane as set forth in claim 1 comprising a sense winding geometrically threaded through the cores of said matrix to reduce signal interference.

4. The fixed program memory plane as set forth in claim 1 wherein
said circuit means for selectively addressing each of said elements comprises $x$ and $y$ selection wires threaded through the rows and columns of said elements,
said circuit means comprising means for driving said $x$ and $y$ selection wires with current pulses which are approximately half-amplitude with respect to the pulse required to switch said elements,
said means for impressing current pulses through said winding passing through the predetermined elements being adapted to supply half-amplitude current pulses thereto.

5. The fixed program memory plane as set forth in claim 4 comprising
a sense circuit for the elements of said matrix,
said sense circuit being coupled to the elements of the matrix in accordance with a pattern providing relatively low half-select signal interference for the readout operations.

6. A fixed program memory plane as set forth in claim 4 comprising a second winding coupled with a second set of predetermined elements of said matrix.

7. a fixed program memory system comprising
a plurality of memory planes,
each plane comprising a plurality of magnetic elements arranged in rows and columns,
said system comprising a plurality of predetermined magnetic elements each of which is to remain in a particular one of its two magnetic states and a plurality of such magnetic elements that are to be switched,
circuit means for selectively addressing each of said elements with coincident current pulses capable of switching the magnetic state of the corresponding elements in each plane that are selectively addressed,
means for maintaining each of said plurality of predetermined magnetic elements that is to remain in a particular magnetic state comprising a winding coupled to said predetermined magnetic elements that are to remain in a particular magnetic state in each of said planes and
means for impressing current pulses through said winding to thereby selectively prevent the switching capability of said coincident current pulses when addressed to said predetermined elements.

8. The fixed program memory system as set forth in claim 7 in which each of said magnetic elements is a toroidal magnetic core.

9. The fixed program memory system as set forth in claim 7 comprising sense circuits for each of said planes,
each of said sense circuits being coupled to the magnetic elements of its particular plane in a pattern providing relatively low signal interference.

10. The fixed program memory system as set forth in claim 8 wherein
said circuit means for selectively addressing each of said elements with coincident current pulses comprises $x$ and $y$ selection wires threaded through the cores of said rows and columns,
said circuit means comprising means for driving said $x$ and $y$ selection wires with current pulses which are approximately half-amplitude with respect to the pulse required to switch said core,
said means for impressing current pulses through the winding passing through the predetermined cores being adapted to supply half-amplitude current pulses thereto.

References Cited by the Examiner

FOREIGN PATENTS 842,928 7/60 Great Britain.

IRVING L. SRAGOW, *Primary Examiner.*

JOHN F. BURNS, BERNARD KONICK, *Examiners.*